J. WILKINS.
Separating Animal from Vegetable Fiber.

No. 203,230.                    Patented April 30, 1878.

Witnesses,
David G. Weems.
W. A. Bertram.

Inventor
Joseph Wilkins,
by R. W. Williams
Attorney.

UNITED STATES PATENT OFFICE.

JOSEPH WILKINS, OF BALTIMORE, MARYLAND.

IMPROVEMENT IN SEPARATING ANIMAL FROM VEGETABLE FIBER.

Specification forming part of Letters Patent No. 203,230, dated April 30, 1878; application filed April 23, 1878.

*To all whom it may concern:*

Be it known that I, JOSEPH WILKINS, of the city of Baltimore, State of Maryland, have invented certain new and useful Improvements in Processes and Apparatus for Separating Animal from Vegetable Fiber; and I hereby declare the same to be fully, clearly, and exactly described as follows, reference being had to the accompanying drawings, in which—

Figure 1:
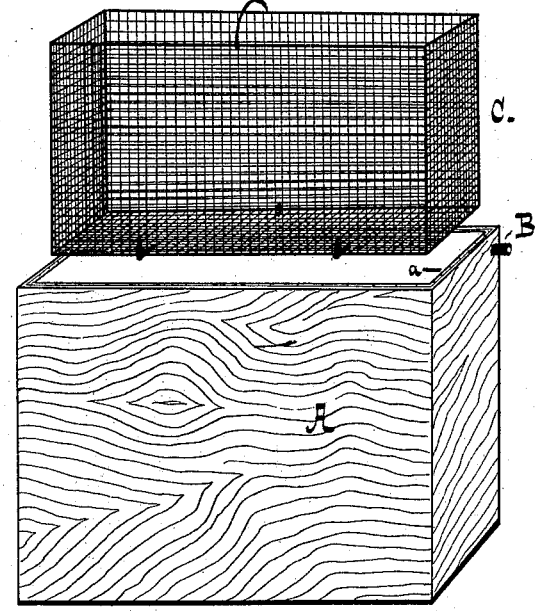
Figure 2:
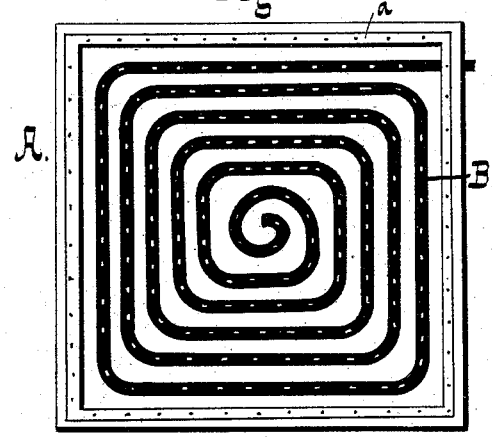

Figure 1 is a perspective view of the said apparatus, and Fig. 2 a plan view of the tank and heating-coil.

This invention relates to processes for separating animal from vegetable fiber, depending upon the disintegration of the latter by means of mineral acids, such as sulphuric, nitric, or hydrochloric; and it consists, first, in treating the rags with the acid in presence of a mordant, whereby the loss of color and consequent contamination and discoloration of the solution are obviated; and, second, in an improved apparatus for carrying out the said process, as hereinafter fully set forth.

In carrying out the said process, I prepare a bath of sulphuric acid diluted to from 8° to 12° Baumé at 62° Fahrenheit, and add thereto sulphate of alumina until the hydrometer indicates about 1° Baumé additional.

The rags of mixed fiber are then immersed in the said solution, which is made to boil, the rags being allowed to remain therein from five to ten minutes, according to their quality—*i. e.*, their relative proportions of wool to cotton fiber.

The rags are then removed and rinsed in pure water, when the vegetable fiber will separate, leaving the wool in a condition to be dried, picked, and carded, when it will constitute an article as merchantable and as well adapted to the manufacture of fabrics (except in so far as its color is concerned) as at first.

Heretofore, in carrying out the processes for separating animal from vegetable fiber by means of acid, the solution became soon charged with the coloring matter of the rags, rendering it useless, and necessitating the preparation of a fresh bath. By combining with the acid-bath a mordant, such as sulphate of alumina, or other mordant compatible with sulphuric acid or the acid used, this discharge of color is prevented and the solution may be used much longer than has heretofore been possible.

The apparatus I make use of is illustrated in the accompanying drawings, in which A represents a tank, preferably of wood, lined throughout with lead, *a*, the joints of the lining being lead-soldered, similarly to those of an ordinary sulphuric-acid chamber. Within the tank and upon or near its bottom is a coil, B, of lead pipe, perforated, as shown, and covering the bottom of the tank. A cage, C, having a hinged bottom, is adapted to be lowered into the tank, and is constructed of some metal or substance not readily attacked by the bath.

The tank A, being partly filled with the acid solution, and the rags to be treated being placed in the cage C, the same is lowered into the tank. A current of steam being then driven through the coil B, finds its exit through numerous minute perforations therein, and causes the acid-bath to boil. When the process is complete the cage is raised from the tank, and its contents discharged, after draining, into a bath of pure water, in which they are thoroughly agitated by suitable beaters. Finally, the wool-fiber is removed, dried, picked, and carded, and sent into commerce.

Having thus described my invention, what I claim as new, and desire to secure by Letters Patent, is—

1. In a process for separating animal from vegetable fiber in mixed fabrics, a coincident or preliminary treatment of the same, for preventing the discharge of their dyes or colors, substantially as described.

2. The process of separating animal from vegetable fiber in mixed fabrics, consisting in treating the same with a bath of dilute acid and a suitable mordant, whereby the contamination of the bath is prevented, as set forth.

3. A bath for the purpose described, consisting of sulphuric acid and sulphate of alumina, as set forth.

4. In combination with the tank A, having leaden lining and perforated coil B, the cage C, substantially as described.

JOS. WILKINS.

Witnesses:
R. D. WILLIAMS,
DAVID G. WEEMS.